(12) United States Patent
McCauley

(10) Patent No.: US 6,616,983 B1
(45) Date of Patent: Sep. 9, 2003

(54) PROCESS FOR MAKING A DECORATIVE METAL SLOT MACHINE TOKEN

(75) Inventor: Donald Joseph McCauley, deceased, late of Cheshire, CT (US), by Amy Lillian McCauley, executrix (73) Assignee: R Z Management, Inc., Las Vegas, NV (US)

( * ) Notice: Subject to any disclaimer, the term of this patent is extended or adjusted under 35 U.S.C. 154(b) by 0 days.

(21) Appl. No.: 08/554,260

(22) Filed: Nov. 6, 1995

Related U.S. Application Data (63) Continuation-in-part of application No. 08/122,125, filed on Sep. 16, 1993, now abandoned.

(51) Int. Cl.[7] .............................. B05D 5/04; B05D 3/06; G09F 3/02; C08J 7/04
(52) U.S. Cl. ........................... 427/508; 427/7; 427/487; 427/510; 427/514; 427/558; 427/385.5; 40/27.5
(58) Field of Search ...................... 427/7, 372.2, 385.5, 427/532, 553, 558, 559, 595, 487, 508, 510, 511, 514, 557; 428/914, 915, 916; 40/27.5

(56) References Cited

U.S. PATENT DOCUMENTS

| | | | | | |
|---|---|---|---|---|---|
| 3,968,582 | A | * | 7/1976 | Jones ........................ | 40/27.5 |
| 3,983,646 | A | * | 10/1976 | Howard ..................... | 40/27.5 |
| 4,694,029 | A | * | 9/1987 | Land ............................ | 522/8 |
| 4,827,640 | A | * | 5/1989 | Jones ........................ | 40/27.5 |
| 5,006,502 | A | * | 4/1991 | Fujimura et al. | |
| 5,008,049 | A | * | 4/1991 | Rose et al. .................... | 264/4 |
| 5,011,754 | A | * | 4/1991 | Ono ............................ | 430/15 |

* cited by examiner

Primary Examiner—Shrive P. Beck
Assistant Examiner—Wesley D. Markhan
(74) Attorney, Agent, or Firm—Kelly Bauersfeld; Lowry & Kelley, LLP (57) ABSTRACT

An improved decorated metal slot machine token produced by coating a metal base with a sublimative dye receptive coating, then infusing sublimative decorative dye into the coating under heat and pressure.

5 Claims, 7 Drawing Sheets

PROCESS FOR MAKING A DECORATIVE METAL SLOT MACHINE TOKEN

This is a continuation in part of Ser. No. 08/122,125 first filed on Sep. 16, 1993, herewith abandoned.

BACKGROUND OF THE INVENTION

Slot machine and other metal gaming tokens have historically been manufactured and decorated by standard coinage minting techniques wherein a preformed metal token blank is embossed or decorated by stamping between hardened metal dies. Such stamping may be a single strike or multiple strike depending upon the depth of the decoration or design that is embossed on the surface of the metal token. Each metal gaming token formed in this manner has the decorative design features formed on the token in bold relief. Most often the denomination of and identity of the casino issuing the token is stamped around the periphery of the token.

Although such tokens have been used for many years by the gaming industry, they suffer from the disadvantages of the lack of positive identification of the issuing casino and the constant replacement of worn or partially worn metal tokens. Because metal gaming tokes are made to standard size, weights and metal composition, the issuing casino cannot prevent the use of metal gaming tokens purchased at a competitor's casino. In addition, as metal tokens are processed through slot machines and counters, an attempt is made to identify and reject counterfeit slugs by the weight and electrical resistance of the token. Unfortunately, as the tokens wear, changes in their weight and electrical resistance results in the rejection of genuine tokens, and the casino is faced with the cost of almost constant replacement of worn or partially worn metal tokens.

Plastic gaming chips have solved the casino identification problems by molding decorative designs into the plastic chip using distinctive coloring and occasionally setting inserts into the face of the chip to identify casino of origin and denomination. Most often plastic gaming chips are stacked in trays by denomination which is visually identified by casino personnel skilled in that art. In addition, because plastic gaming chips are limited to table play, abrasive wear encountered in machine handling of metal gaming tokens is not an issue.

However, because plastic chips are significantly lower in weight and lack the stick slip characteristics required to function in slot machines, plastic chips cannot be used in place of metal tokens.

From time to time, various mints have attempted the identification problem in metal gaming tokens by using metal laminate blanks of differing appearance or coloring. Similarly, inserts of various materials on to the faces of metal gaming tokens have also been tried.

PRIOR ART

The examination of the application as first filed revealed the following art:

U.S. Pat. No. 4,026,309, and its divisional counter part, U.S. Pat. No. 3,983,486, Robert Howard inventor, discloses a novel plastic gaming chip which has metallic weights inserted into its top and bottom faces and a mechanism for spectroscopic and optical identification and counting of the chips.

U.S. Pat. No. 3,968,582, Bernard B. Jones inventor, discloses an improved process for fabricating plastic gaming chips wherein an injection molding compound is injected at selected configured locations within and between a pair of aligned, substantial flat ovular non-metallic rings.

U.S. Pat. No. 3,953,932, John W. Graves inventor, discloses a game or casino chip integrally formed of several distinct layers of moldable thermoplastic materials manufactured by a multi-step molding operation.

U.S. Pat. No. 3,280,489, C. Bergman inventor, discloses a substantiate silver dollar in the form of a metal disc with paper silver certificates embedded in recesses in top and bottom faces which are covered with transparent discs so that denominations can visually be identified.

None of the above prior art describes the art or form of the instant invention.

OBJECT OF THE INVENTION

It is the primary object of the invention to provide a slot machine gaming token which is optically and spectrophotometrically identifiable.

An additional object of the invention is to provide an optically and spectrophotometrically identifiable slot machine gaming token which has the weight, thickness and electrical resistance of the conventional metal token.

It is yet an additional object of the invention to provide an optically and spectrophotometrically identifiable slot machine token which has improved abrasion and impact wear resistance.

It is yet an additional object of the invention to provide a multi-colored aesthetically pleasing metal gaming token.

SUMMARY OF THE INVENTION

In simplest terms the instant invention utilizes a minted metal token as the base for an abrasion and impact resistant coating which can extend over the entire token-faces but preferably extends over a recess or recesses in the center of the token faces.

In practice, an abrasion-resistant coating composition is applied to the metal token and cured by heat, ultra-violet ("UV") light or electron beam ("EBN") exposure. High solids and 100% reactive liquid coatings or oligomer and powder coatings are preferred for environmental reasons on the basis of their low emission levels of volatile organic compounds. UV and EB coatings are most preferred due to their extremely fast cure rates.

Once coated, a decorative design is infused into the cured coating by the well known subliminatlon dye transfer process. In this system, a transfer medium (often paper) is printed with volatilizable dye based inks. The printed transfer medium is pressed against the coated top and bottom faces of the coated metal token. Heat is then applied to volatilize the dye inks which infuse into the polymerized coating.

This process and technology produce decorations which penetrate deep into and become part of the polymer coating. As such, they are not removed by abrasion as readily as conventional printing which remains on the surface of the coating. The permanence of these colors makes practical the identification of both the issuing casino and token denomination by spectrophotometric scanning devices, while the large number and full color range of commercially available sublimatable dyes insures that there is a sufficient number of distinct spectral responses to assign to each casino.

DETAILED DESCRIPTION

Figure 1:
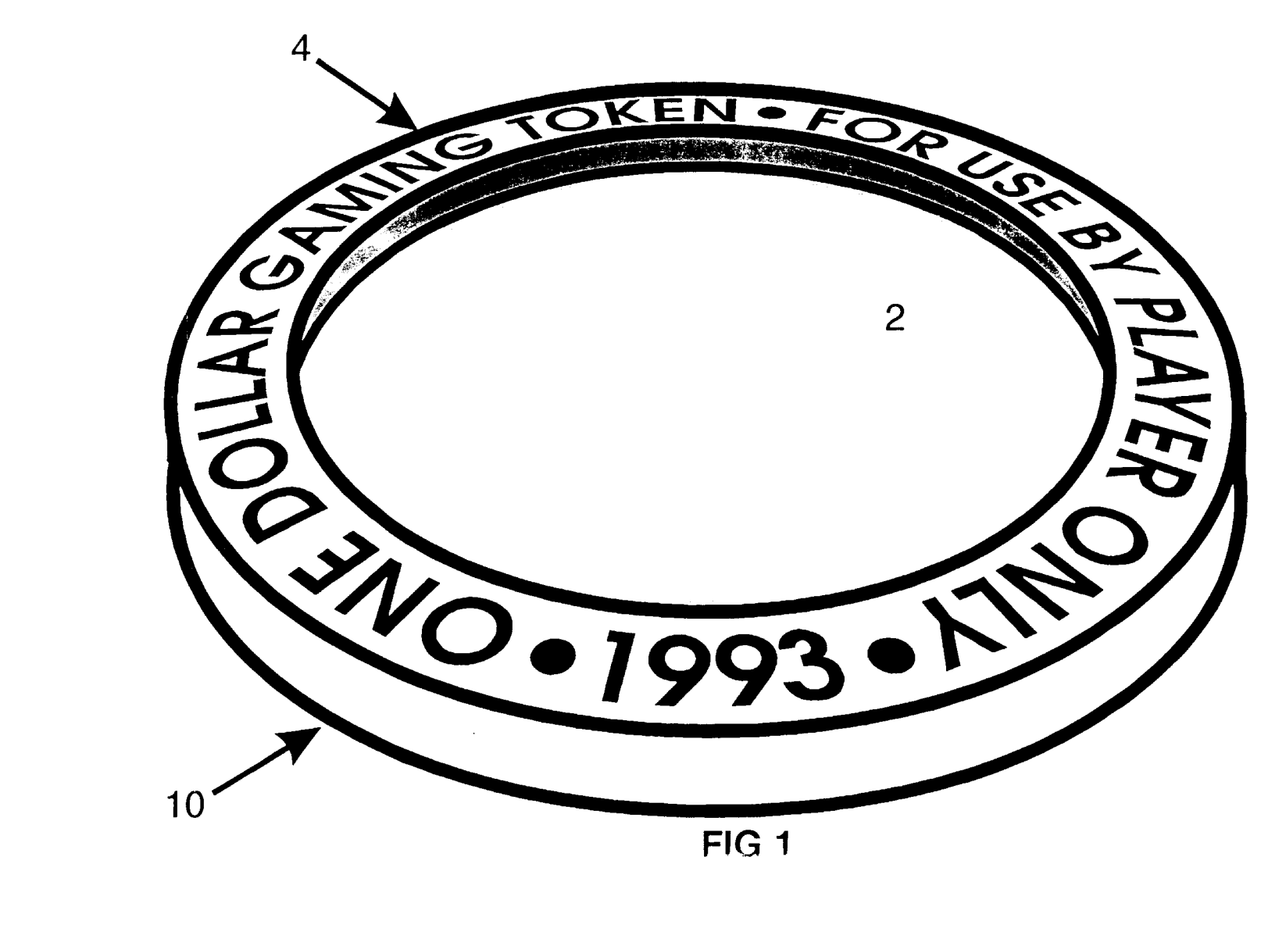
FIG. 1 is a perspective view of a blank metal taken.

An embossed cleansed and primed metal gaming token 10 is shown in FIG. 1 (top viewing; it being understood that top and bottom faces of the metal token are identical) with embossed letters 14 and the periphery 4 and a slight recess 2 in the center of the token.

Figure 2:
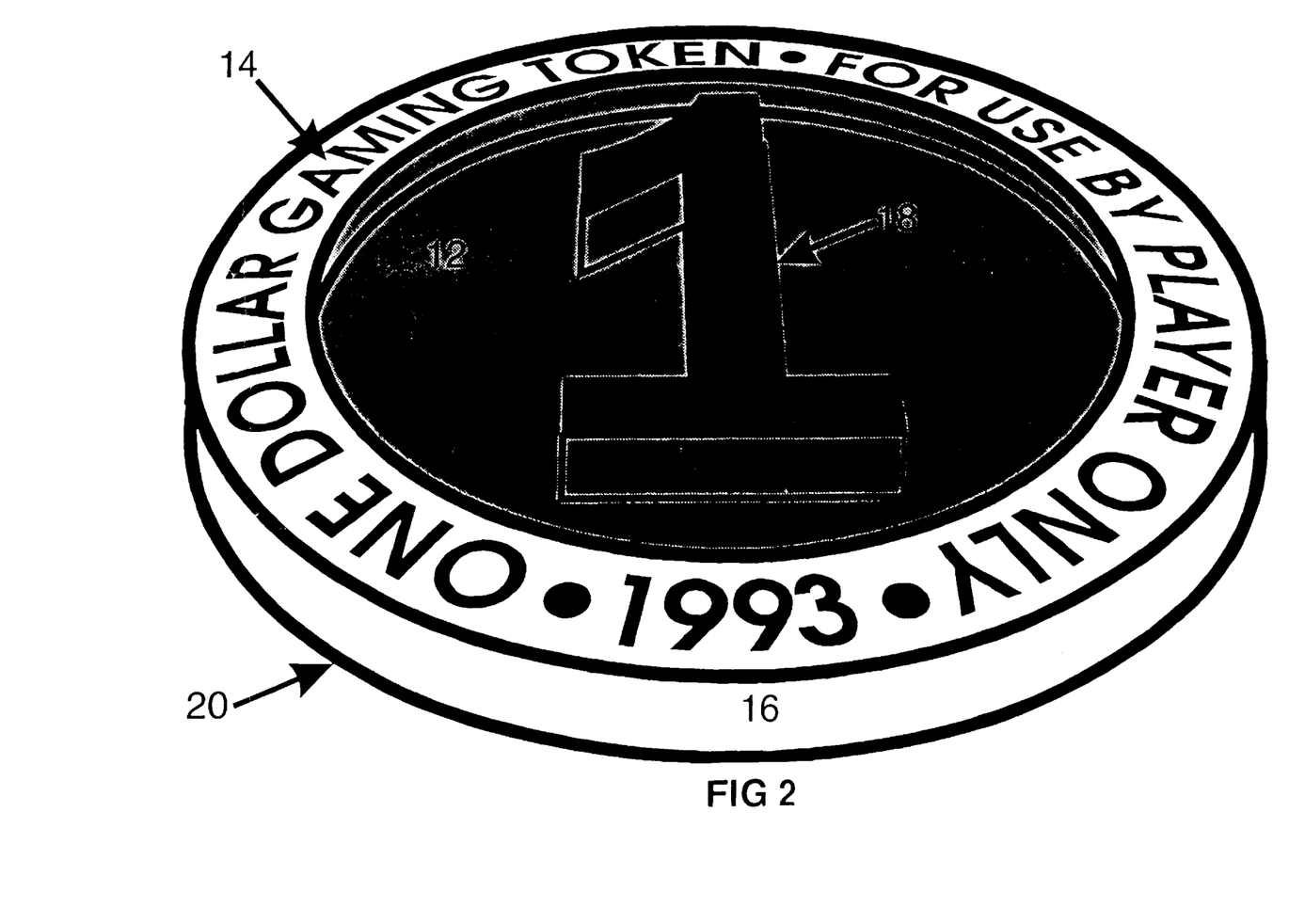
FIG. 2 is a perspective view of a decorated metal token.

FIG. 2 illustrates a decorated token 20 with polymerized coating 12 in the recess in the center of the metal token, embossed peripheral metal decoration 14 and dyed decoration 18 which is infused into and becomes part of coating 12. Coating 12 must be pliant, resilient and abrasion resistant and securely adhered to the surface of the metal gaming token.

Properly formulated cured and dye-infused coatings yield metal gaming tokens which have a life expectancy of over 100,000 slot machine/counting machine cycles. Conventional ink printed tokens usually show wear in 5,000 cycles and uncoated tokens often requiring replacement in 25,000 to 50,000 cycles depending upon the nickel silver alloy and embossing design that is used.

The formulated dyes which are infused into the metal gaming token can be selected to be responsive to almost all of the visible and infrared spectrum and designed to yield specific spectrophotometric response to given wavelengths. Thus positive identification of the issuing casino and the denomination of the token can be made by both visual and spectrophotometric means.

Figure 4:
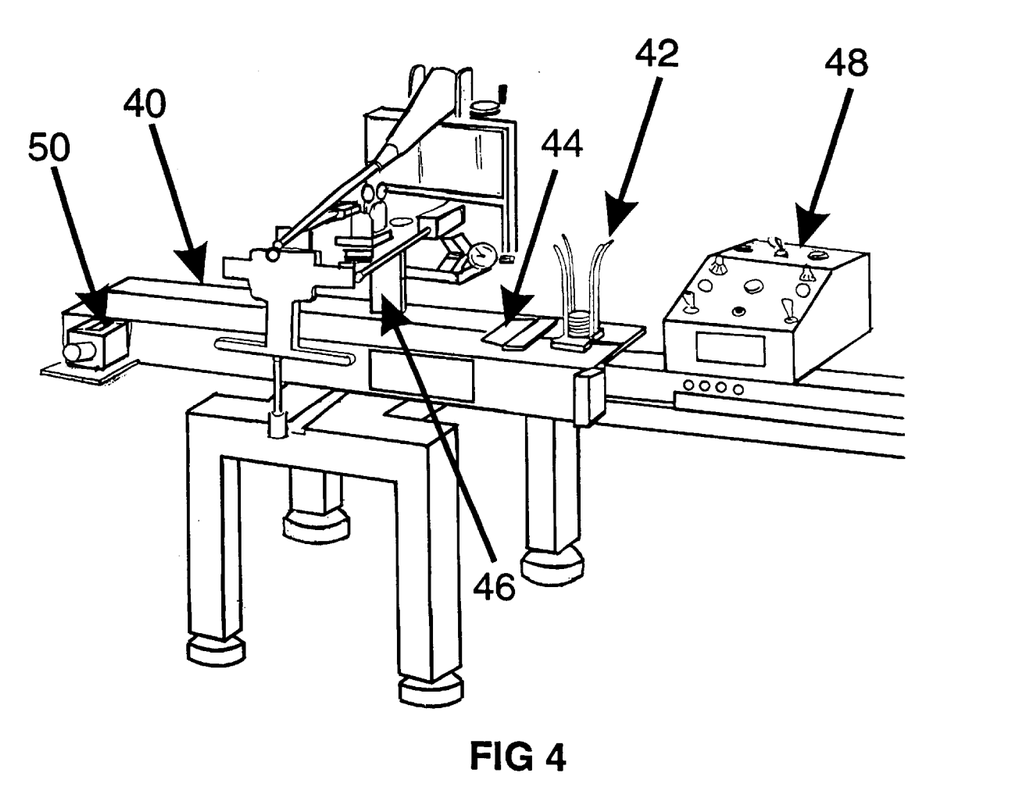
FIG. 4 Is a simplified view of one means of applying an uncured 100% solids polymerizable coating to a metal token.

FIG. 4 is a simplistic representation of a liquid 100% solids polymerizable coating machine, it being understood that other methods of application of the polymerizable coating are feasible include dipping, spraying, padding, brushing and the like. Powder coatings can also be applied to metal gaming tokens by use of electrostatic spray and fluidized bed dipping techniques.

Figure 5:
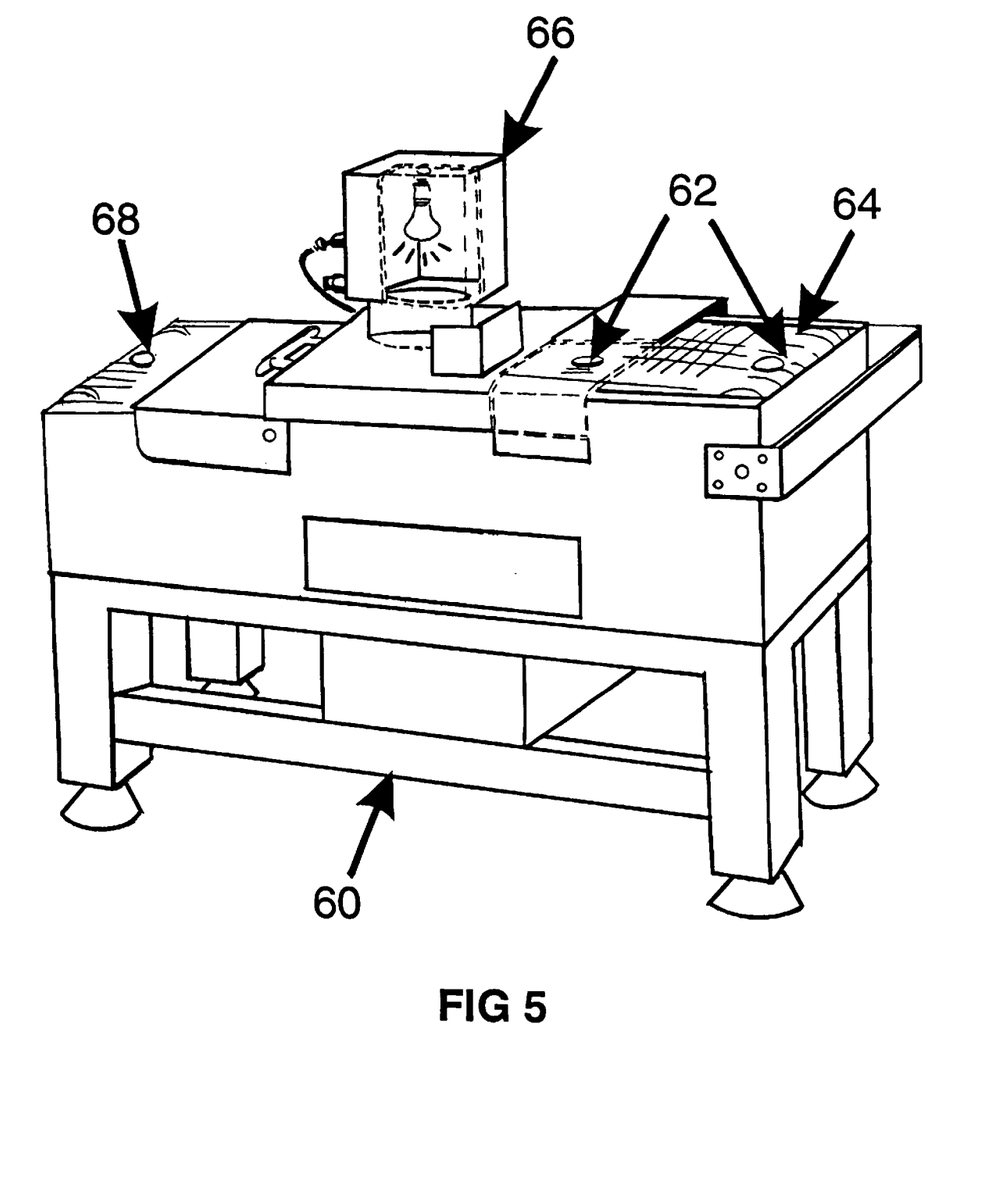
FIG. 5 is a perspective view of a ultra-violet accelerated coating polymerizeable or curing station.
Figure 6:
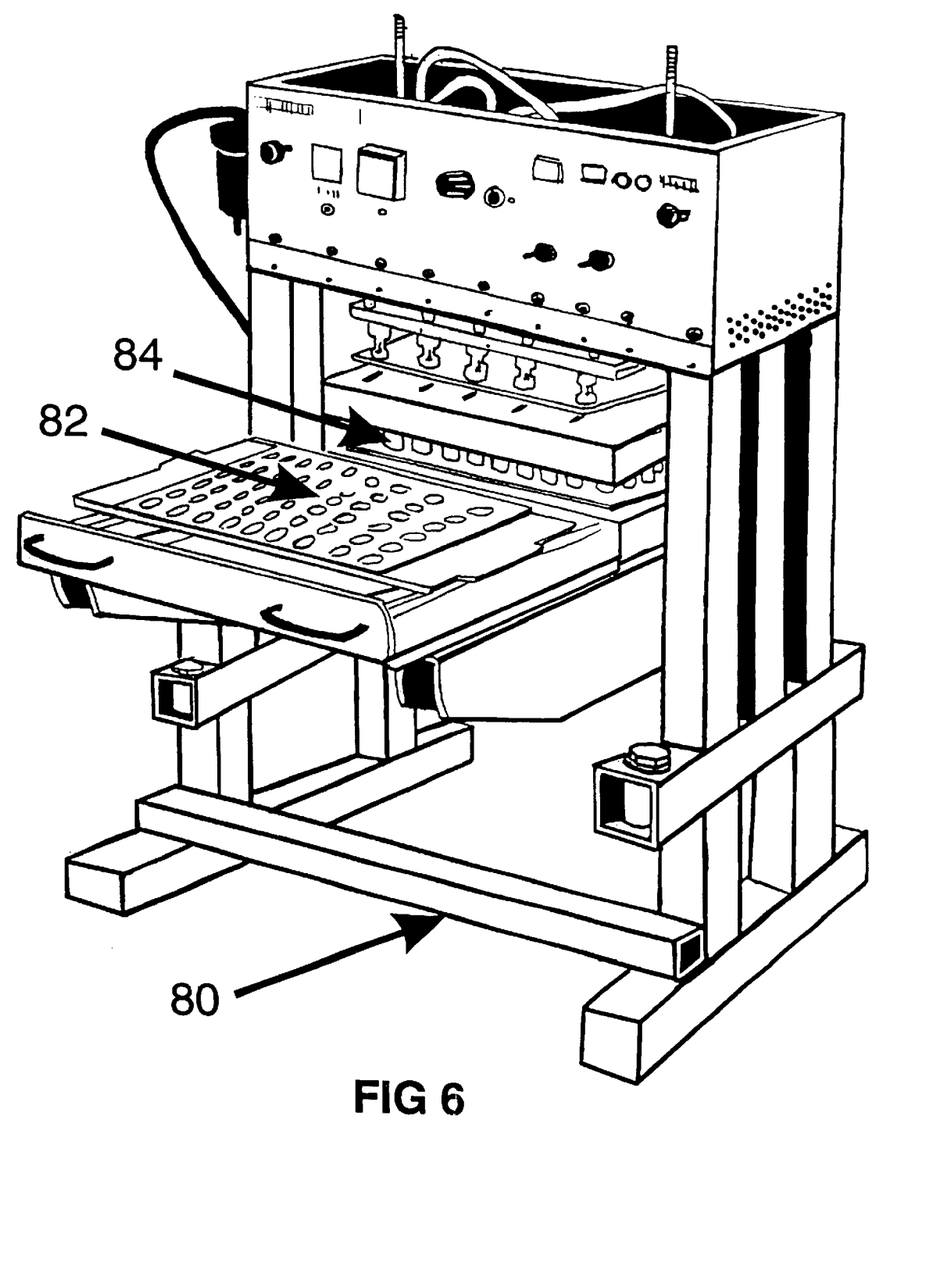
FIG. 6 is a perspective view of volatilizable dye transfer stations.

The system shown in FIG. 4 has a stock loading station 42, a means of transferring tokens 40 and 44 to the polymerizable 100% liquid polymer application station 46, machinery controls 48 and inspection station 50. Coated tokens 62 are transported to curing station 60. As shown in FIG. 5, token are placed in conveyor belt 64 passing under and ultra-violet light source 66 to initiate polymerization of the liquid coating. Cured transparent coated tokens 68 merge from ultra-violet light exposure 64. The coated tokens are then inverted and the coating process repeated on the reverse side.

Although uftra-violet initiated curing of the token is preferable, liquid polymers polymerized by heat also develop desirable physical characteristics but require cure in a temperature controlled oven.

Figure 7:
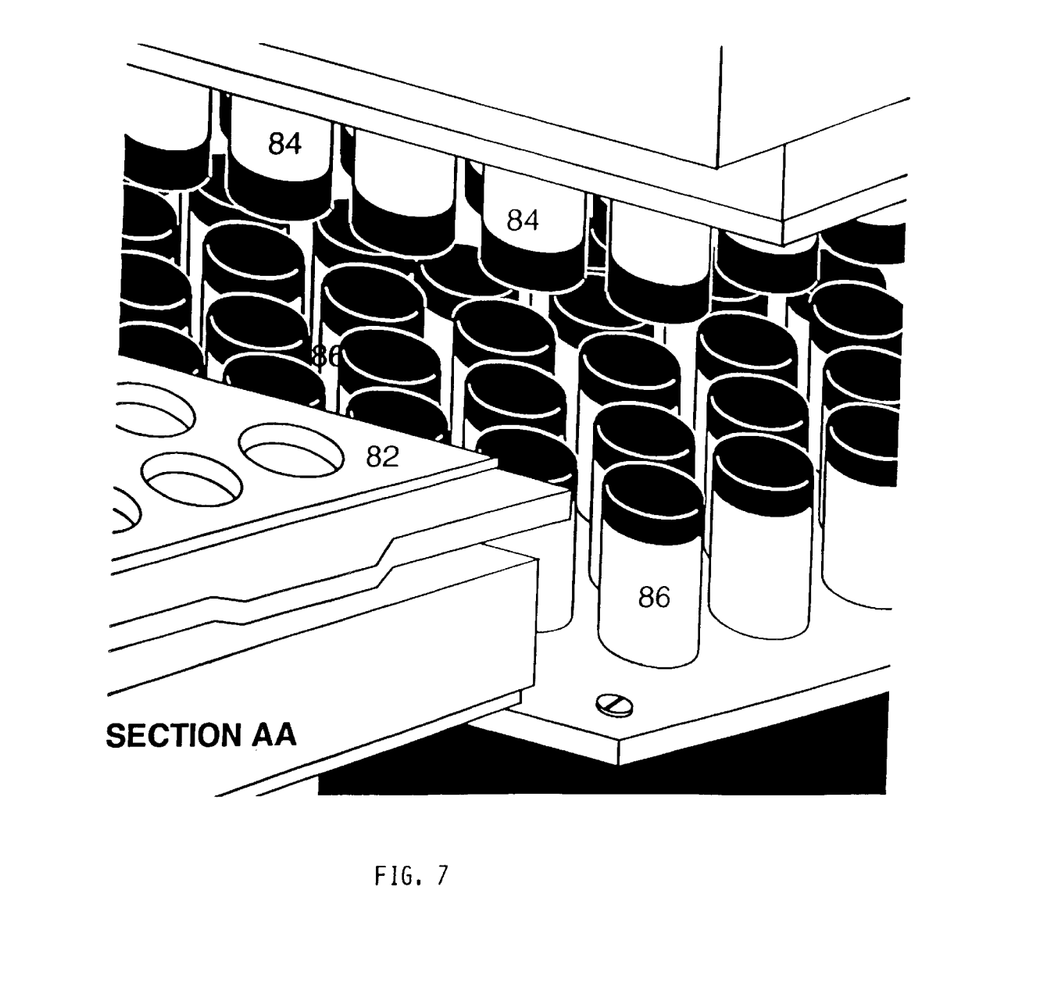
FIG. 7 is a partial perspective view of a sublimation press used in accordance with the present invention.

With reference to FIG. 7, having been coated on both sides, the metal token are subsequently loaded into carrier trays 82 in sublimation press 80. The coated token in trays 82 register with heated pressure pads 84 and 86. Print color intensity, sharpness and depth of infusion are controlled by regulating the process temperature, pressure and exposure time. The press is subsequently opened and the decorated metal tokens are removed.

A number of polymers are suitable for the coating of the instant invention, and include but are not limited to polyurethanes, acrylics, epoxies and polybutadienes. Coatings containing polyurethanes are preferred on the basis of the excellent abrasion resistance of polyurethane resins in general.

As mentioned.above, UV and EB coatings are preferred due to their extremely fast cure rates. Such coatings typically consist of blends of acrylate or methacrylate functional base resins and reactive diluents. The reactive diluents are typically mono-, di- and polyfunctional acrylate or methacrylate esters of various organic compounds. Alternately, styrenic monomers can also be used. Available base resins include polyurethanes, acrylics, epoxies, and polybutadienes, although the modified polyurethanes are preferred due to their excellent abrasion resistance.

Although the formation of the dye infused decorative coatings described herein has been limited to metal gaming tokens, it is understood that the technology may be useful for decoration of other metal objects such as jewelry, folding knife handles, key rings, holders and the like.

The coatings utilized herein may be transparent, translucent or opaque. The later translucent and opaque versions may be formed with pigments dispersed in the liquid to achieve a desired background color without interfering with the infusion of dyes into the coating.

The cured coating must also be heat resistant so as to be able to withstand the heat and pressure which is needed to effect dye transfer from the transfer sheet into the coating. Such dye transfer temperatures often exceed 350° F. or 400° F. under pressures of 100 psi.

Figure 3:
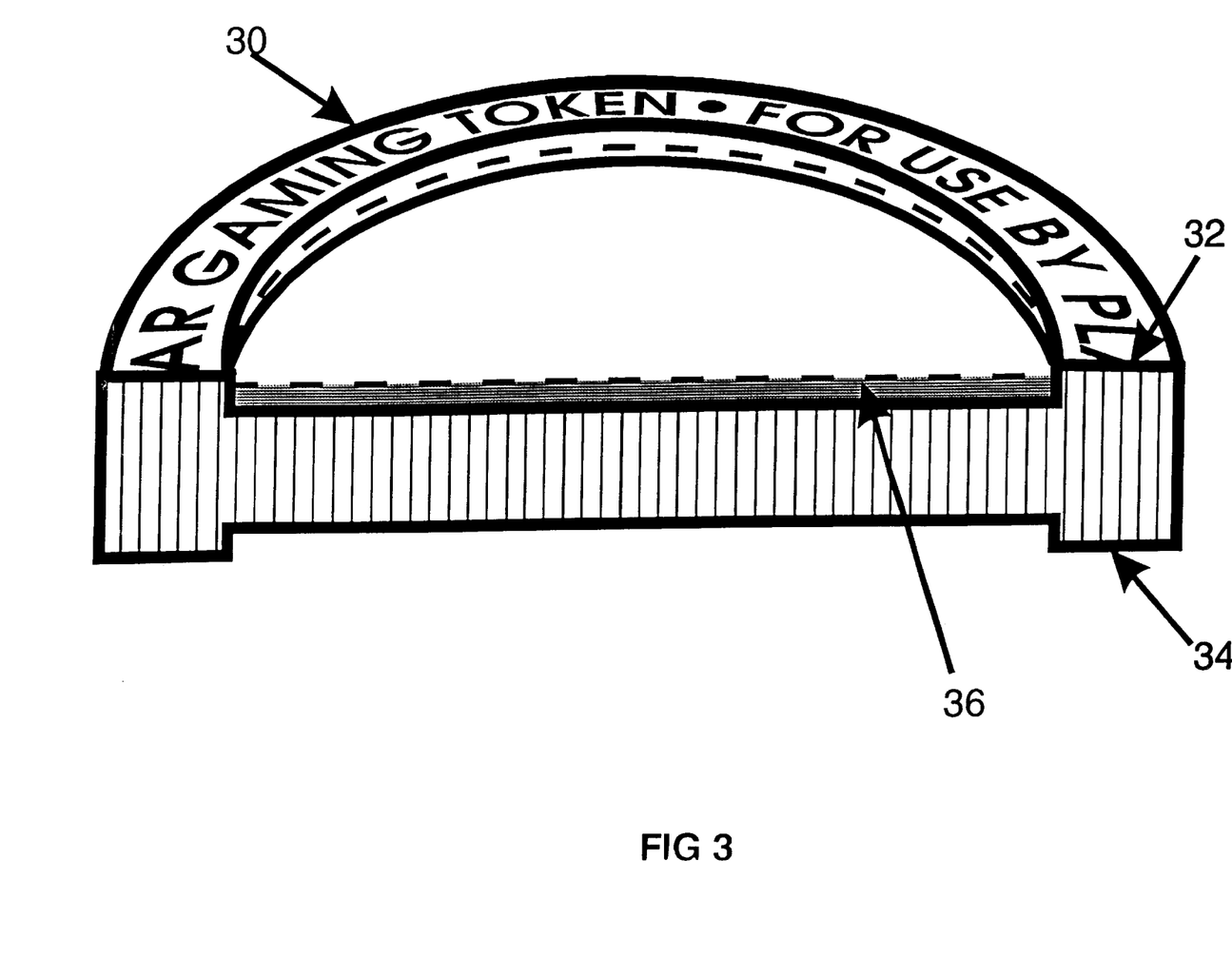
FIG. 3 is a cross section view of a decorated metal token.

With reference to FIG. 3, cured coating 36 thicknesses used in the instant invention may be as great as 0.015 inches. Minimum thicknesses are established by the inherent abrasion resistance of the cured coating. Reference numbers 32 and 34 represent the top and bottom surfaces of the outer periphery 30 of the token. Although the formation of the dye infused decorative coatings described herein has been limited to metal gaming tokens, it is understood that the technology may be useful for decoration of other metal objects such as jewelry, folding knife handles, key rings, holders and the like.

The foregoing is designed to illustrate the basic process and materials used in the invention. It is not limited in scope or nature which is limited in the appended claims.

What I claim is:

1. A process for manufacturing a decorative metal slot machine token, comprising the steps of:
   providing a metal token blank having a top surface including an outer periphery defining a central cavity completely encircled by the outer periphery;
   filling the top surface cavity with a polymerizable and sublimation dye transfer receptive liquid oligimer to a level at or below the surface of the outer periphery;
   polymerizing the liquid oligimer into a hardened insert by exposing the liquid oligimer within the top surface cavity to a polymerizing radiation source; and
   infusing sublimable dye into the hardened insert.

2. The process of claim 1, including the steps of providing a metal token blank having a bottom surface including an outer periphery defining a central cavity completely encircled by the outer periphery, filling the bottom central cavity with a polyrnerizable and sublimation dye transfer receptive liquid oligimer to a level at or below the surface of the outer periphery, polymerizing the liquid oligimer into a hardened insert by exposing the liquid oligimer within the bottom surface cavity to a polymierizing radiation source, and infusing sublimable dye into the hardened insert.

3. The process of claim 2, wherein the infusing steps include the steps of placing the inserts into contact with a dye transfer sheet and a heated press.

4. The process of claim 2, wherein the liquid oligimer of the bottom and top surface cavities is capable of being polymerized when exposed to an electromagnetic source.

5. The process of claim 4, wherein the polymerizing step includes the step of exposing the top and bottom liquid oligimers to an ultraviolet light source.

\* \* \* \* \*